Dec. 26, 1950  C. V. REDINGER  2,535,319
METHOD OF MAKING ORNAMENTAL CAKES
Filed Oct. 28, 1949

Inventor
Clarence V. Redinger

By Clarence A. O'Brien
and Harvey B. Jacobson
Attorneys

Patented Dec. 26, 1950

2,535,319

UNITED STATES PATENT OFFICE 2,535,319

METHOD OF MAKING ORNAMENTAL CAKES

Clarence V. Redinger, San Bernardino, Calif., assignor of forty-nine per cent to Delanoy E. Roode, Highland, Calif.

Application October 28, 1949, Serial No. 124,081

2 Claims. (Cl. 107—54)

This invention relates to an improved method of making ornamental loaf-type cakes having a substantially central part, of special design or shape and of a different color than the outer part of the cake, extending continuously from end to end of the cake, so that, when the cake is sliced, the central portion of each slice will consist of a portion of said central part of the cake.

The primary object of the present invention is to provide a method which may be readily and successfully carried out without the need of special skill and by the use of conventional implements and baking pans.

The present method will be clearly understood from the following description when considered with the accompanying drawing, in which.

Figure 1:
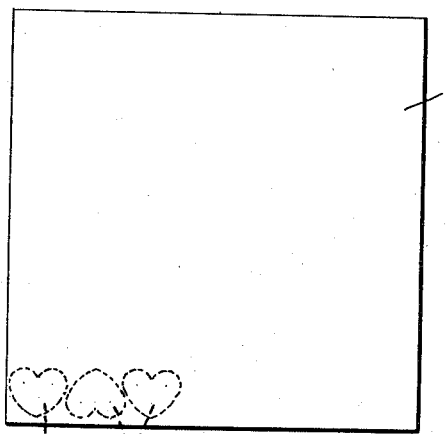
Figure 1 is a plan view of the lightly baked sheet cake from which are cut a sufficient number of similar pieces of the desired design or shape to produce the central part of the final ornamental loaf-type cake.
Figure 2:
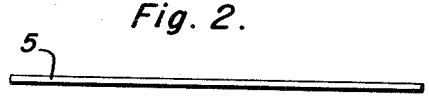
Figure 2 is an edge view of the cake shown in Figure 1.
Figure 3:
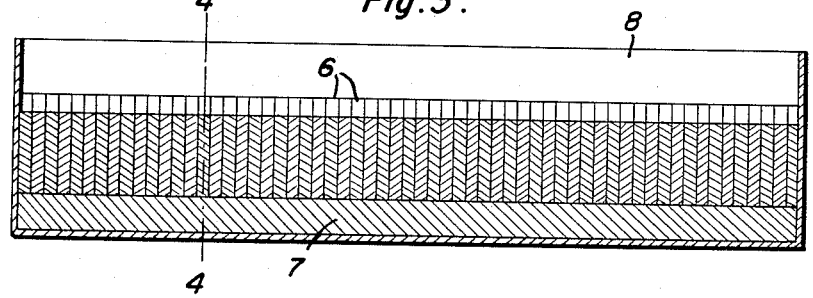
Figure 3 is a central longitudinal section through a baking pan having a body of unbaked cake batter in the bottom portion thereof and a number of the pieces which were cut from the lightly baked sheet cake disposed on said body of batter to form the continuous central part of the final cake, in accordance with a step of the present method.
Figure 4:
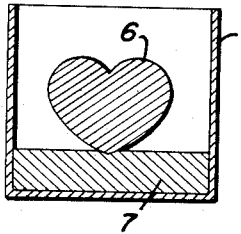
Figure 4 is a transverse section taken on the line 4—4 of Figure 3.
Figure 5:
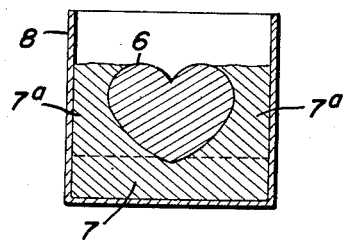
Figure 5 is a view similar to Figure 4, showing more unbaked cake batter placed in and filling the spaces between the sides of the pan and the pieces of lightly baked sheet cake, in accordance with the succeeding step of the present method.
Figure 6:
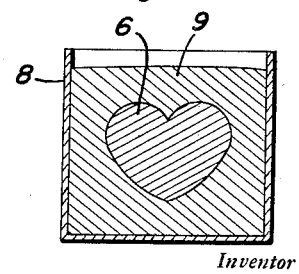
Figure 6 is a view similar to Figure 5 showing the finished loaf-type cake produced by baking the batter and cake pieces of Figure 5 in the pan.

Referring in detail to the drawing, a sheet cake 5 of a predetermined character and color, is lightly baked in the usual way within an ordinary shallow baking pan. By the use of an ordinary cookie cutter or the like, a predetermined number of wafer-like pieces 6, of the desired shape or configuration, are then cut from the cake 5. A quantity of unbaked cake batter 7 of a color different than that of the pieces of cake 6 is then deposited in the bottom portion of an ordinary elongated and relatively deep baking pan 8, whereupon the pieces of cake 6 are placed vertically upon the batter 7 in face to face relation from end to end of the pan 8 centrally between and in spaced relation to the sides of the latter, as shown in Figures 3 and 4. The batter 7 is provided of such depth that the pieces of cake 6 will be disposed substantially centrally between the top and bottom of the final cake. After placing the pieces of cake 6 as stated, the spaces between them and the sides of the pan 8 are filled with more of the same cake batter as at 7a to a level substantially at the tops of said pieces of cake 6, as shown in Figure 5. The pan 8 and its contents are then placed in an oven to bake the cake batter and complete baking of the pieces of cake surrounded thereby, the batter rising and covering said pieces of cake during the baking operation as shown in Figure 6 at 9.

From the foregoing description, the nature and advantages of the present method will be understood and appreciated by those skilled in the art.

Having described the invention, what is claimed as new is:

1. The method of making ornamental cakes which consists of depositing a quantity of unbaked cake batter of one color in the bottom portion of a baking pan, placing a number of lightly baked wafer-like pieces of cake of a different color vertically upon said batter in face to face relation and from end to end of the pan as well as centrally between and in spaced relation to the sides of the pan, filling the spaces between said pieces of cake and the sides of the pan with more of the same batter, and then baking the batter and completing baking of the pieces of cake in the pan so that the batter rises and covers said pieces of cake.

2. The method of making ornamental cakes, which consists of depositing a quantity of unbaked cake batter of one color in the bottom portion of a baking pan, lightly baking a sheet cake of a different color, cutting a number of similar wafer-like pieces from said sheet cake, placing the wafer-like pieces of cake vertically upon said batter in face to face relation and from end to end of the pan as well as centrally between and in spaced relation to the sides of the pan, filling the spaces between said pieces of cake and the sides of the pan with more of the same batter, and then baking the batter and completing baking of the pieces of cake in the pan so that the batter rises and covers said pieces of cake.

CLARENCE V. REDINGER.

REFERENCES CITED

The following references are of record in the file of this patent:

UNITED STATES PATENTS

| Number | Name | Date |
|---|---|---|
| 1,445,187 | Vaughan | Feb. 13, 1923 |
| 1,492,603 | Matson | May 6, 1924 |
| 1,597,979 | James et al. | Aug. 31, 1926 |